July 14, 1964 D. J. WAYFIELD 3,140,550
SWIMMING INSTRUCTION APPARATUS
Filed June 23, 1958 4 Sheets-Sheet 1

INVENTOR.
DAVID J. WAYFIELD
BY

July 14, 1964    D. J. WAYFIELD    3,140,550
SWIMMING INSTRUCTION APPARATUS
Filed June 23, 1958    4 Sheets-Sheet 2
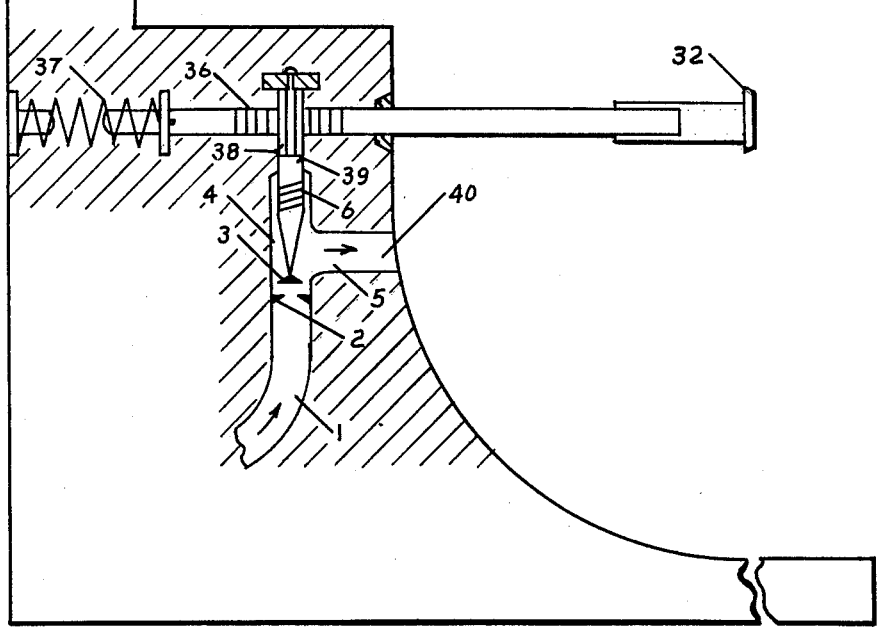
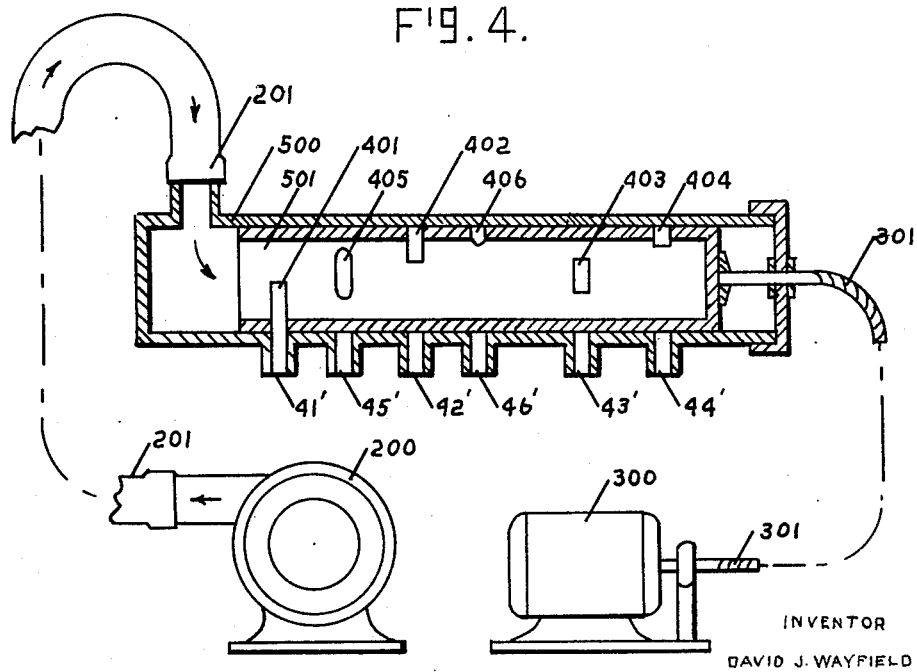
INVENTOR
DAVID J. WAYFIELD July 14, 1964 D. J. WAYFIELD 3,140,550
SWIMMING INSTRUCTION APPARATUS
Filed June 23, 1958 4 Sheets-Sheet 3

United States Patent Office 3,140,550
Patented July 14, 1964

3,140,550
SWIMMING INSTRUCTION APPARATUS
David J. Wayfield, 567 Montauk Highway,
West Islip, Long Island, N.Y.
Filed June 23, 1958, Ser. No. 743,683
13 Claims. (Cl. 35—29)

This invention relates to apparatus for use in giving swimming instruction and more particularly to such devices which provide a series of indications for appropriate coordination in the execution of swimming movements.

Many devices exist in the prior art directed to the problem of teaching swimming. Most of them are rather cumbersome mechanical contrivances which are used out of the water and consequently deprive the learner of experience with actual swimming conditions during the exact period of time when it is most important that such familiarity should be developing. Furthermore, most of the prior art devices require the strapping of the student's limbs to various moving elements of the apparatus which provides an artificial character to the instruction and forces rather than guides the student through the proper motions.

The present invention has been carefully contrived to avoid the many disadvantages of the prior art devices and to cope with the many different problems which confront various people when they are learning to swim. The apparatus enables the swimming student to be guided through the various stages of instruction and to learn the various movements of the body and how to coordinate them.

The present invention permits the teaching of swimming in the proper medium, i.e. water. In addition, the apparatus permits the pupil to make mistakes. Thus, the pupil's limbs are not forced through predetermined paths, but instead the pupil is given signals which enable him to properly execute and coordinate his limb movements.

It is an object of the present invention to provide apparatus for teaching swimming in the water and providing the student with signals indicative of proper limb coordination.

Another object is to provide a device of the class described, providing adjustable lifting power or buoyancy for the user.

Another object is to provide a submerged signal device for swimming instruction which provides unobstructed use of the entire body of the student in executing swimming movements, the device having contact only with the user's head in one modification of the invention and no physical contact in still another modification.

Another object is to provide such a device which can be controlled at a remote position out of the water and is adapted for simultaneous use with a plurality of similar devices for class instruction.

Another object is to provide appropriate instruments which will enable the student to know the equivalent distance and speed that he has swum.

A still further object is to provide such a device which will enable the user to learn to swim in a confined area.

With the foregoing objects in view, together with such other objects and advantages as may subsequently appear, the invention resides in the parts, and in the construction, combination and arrangement of parts described, by way of example in the following specification of presently preferred embodiments of the invention, reference being had to the accompanying drawings which form a part of said specification and in which drawings:

FIG. 3 is a partial, vertical sectional view of the head-operated valve as shown in FIGS. 1 and 2;

FIG. 4 is a partial, sectional view of the fluid system as used in one embodiment of the invention;

Figure 1:
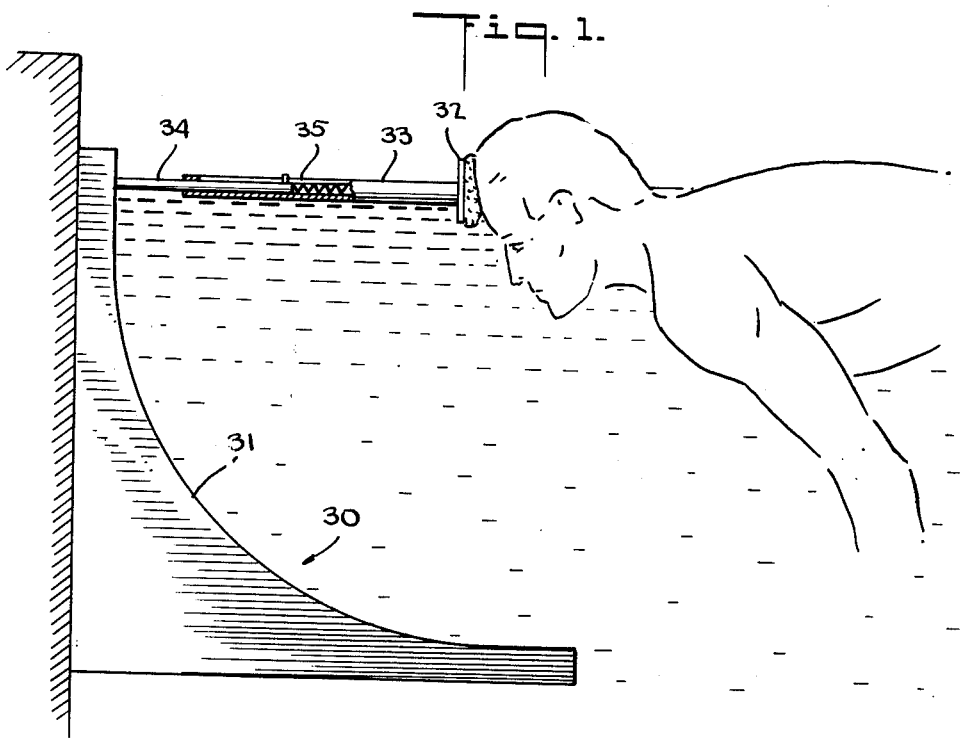
FIG. 1 is a perspective view of one embodiment of the invention, showing its general arrangement during use.

Referring now to the drawings, FIG. 1 shows an aquatic device according to the present invention and is designated generally by the reference numeral 30. It consists of an arcuate, non-buoyant cabinet 31 with head-rest means 32 engaging the head of the swimmer and hollow rod 33 which is internally attached to rod 34 by a connecting compression spring 35. The cabinet 31 is constructed of lightweight metallic or plastic material of a suitable kind, preferably of non-corrosive properties and has a hollow internal structure.

Figure 2:
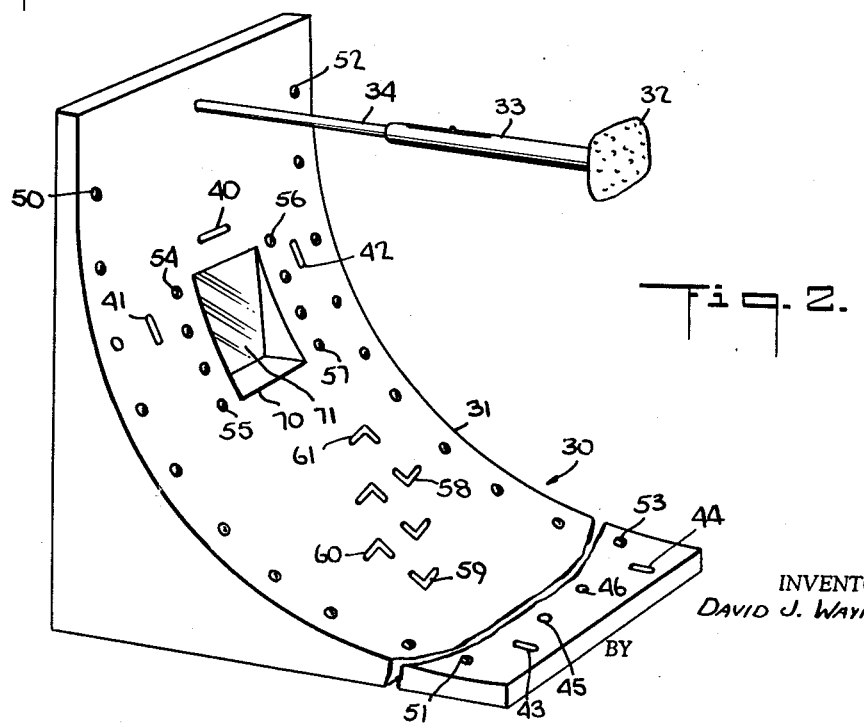
FIG. 2 is another perspective view of the embodiment of the invention shown in FIG. 1.

The front of the invention as seen by the swimmer is shown in FIG. 2 wherein 40–46 represent adjustable nozzles that emit jets of water towards the swimmer. Nozzle 40 directs water towards the swimmer when a spring-operated valve is opened by rod 34 in response to the forward thrust of the swimmer against head-rest 32. Nozzles 41 and 42 alternately direct jets of water to the left and right forearms when the latter are expected to be in a downward position and for the approximate time needed to transcribe an arc of about 30 degrees with the arms. Nozzles 43 and 44 alternately direct jets of water to the left and right legs during the upward swing of the legs and for a length of time corresponding to the speed or tempo desired by the swimmer. Nozzles 45 and 46 simultaneously direct jets of water to the left and right side of the swimmer with an intensity that varies directly with the swimmer's need for buoyancy. When the swimmer is learning the American Crawl and wishes to inhale on the left side, nozzle 45 emits a jet of water with increased intensity following the jet of water from nozzle 41, thus assisting the swimmer in effecting the body roll needed for inhaling on the left side.

In FIG. 2, 50–61 represent six series of lamps which when progressively illuminated indicate desired positions of the swimmer's body. The series of lamps 50–51 are progressively illuminated to correspond to the desired speed and position of the swimmer's left arm. When lamp 50 is illuminated, the left arm should be in forward, horizontal position and when lamp 51 is illuminated, the left arm should be in a downward, vertical position. The series of lamps 52–53 operates the same way for the swimmer's right arm and are illuminated alternately and rhythmically with series of lamps 50–51. Series 54–55 represent lamps which are progressively illuminated to correspond to the downward movement of the left leg. Series of lamps 56–57 operates the same way for the right leg and are illuminated alternately and rhythmically with series of lamps 54–55. The series of lamps 58–59 are progressively illuminated to correspond to the desired position of the head when turning upward to inhale on the left side. Series of lamps, 60–61, on the other hand, indicate the desired timing and positioning of the head during exhalation.

The recess 70 in cabinet 31 holds an adjustable mirror 71 which enables the swimmer to observe the movements of his legs as they conform with the progressively illuminated lamps 54–57. In other modifications of this invention, recess 70 will hold a translucent screen.

FIG. 3 shows a water valve that is opened by the swimmer's head pressing against head-rest 32 and which is closed by compression spring 37. Rack 36 meshes with gear teeth 38 causing piston 39 to rotate. When rotated in one direction, the piston is lifted by virtue of its threads 6, causing the solid disk 3 to be separated from the aperture 2 of water inlet tube 1. Water under pressure then escapes into the interior of housing 4, out through tube 5 and its aperture 40, causing the advancing swimmer's pressure against head-rest 32 to be reduced and the swimmer thus stabilized relative to the cabinet by this feedback system.

FIG. 4 shows the fluid system in which a hollow distributing valve 501, within housing 500, is rotated by motor 300 by way of a flexible shaft 301. Water under pressure is supplied to the interior of valve 501 by pump 200 through hose 201. As the valve is rotated, the openings 401–406 in said valve coincide with openings 41'–46' in said housing causing rhythmic jets of water to escape by way of hoses (not shown) through apertures 41–46 in cabinet 31. Since apertures 41–46 may also be adjustable nozzles, the flow of water through same can be reduced or stopped completely according to the requirements of the swimming lessons being given. Thus it will be seen that in teaching the American Crawl, the apertures 45 and 46 need not both be open at the same time and with advanced students, may be both closed. The entire fluid system is intended only to illustrate the principles involved and not necessarily to effect any particular swimming movement.

Figure 5:
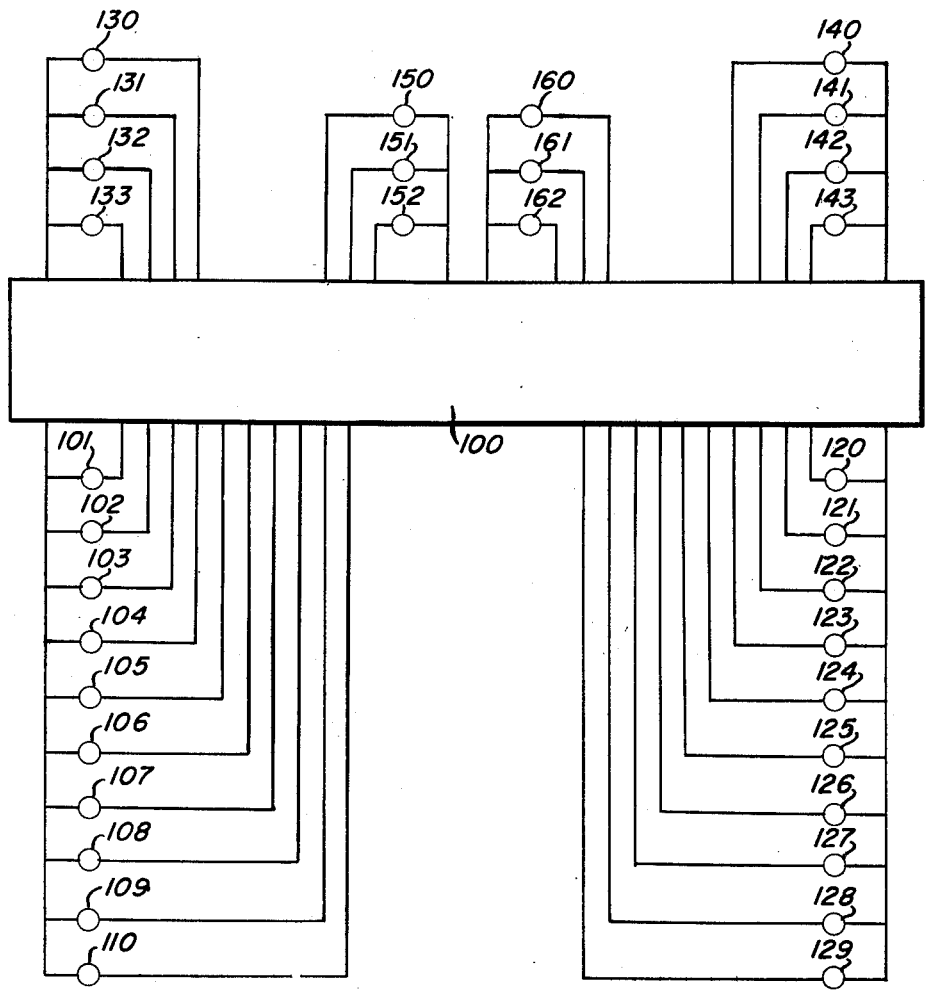
FIG. 5 is a wiring diagram of the light circuit, including a timer shown symbolically.

FIG. 5 shows a timer 100 and various wiring circuits wherein lamps 101–110 correspond to series of lamps 50–51 in FIG. 2; lamps 130–133 correspond to series of lamps 54–55; lamps 120–129 correspond to series of lamps 52–53; lamps 140–143 correspond to lamps 56–57; lamps 150–152 correspond to series of lamps 60–61; and lamps 160–162 correspond to series of lamps 58–59.

Figure 6:
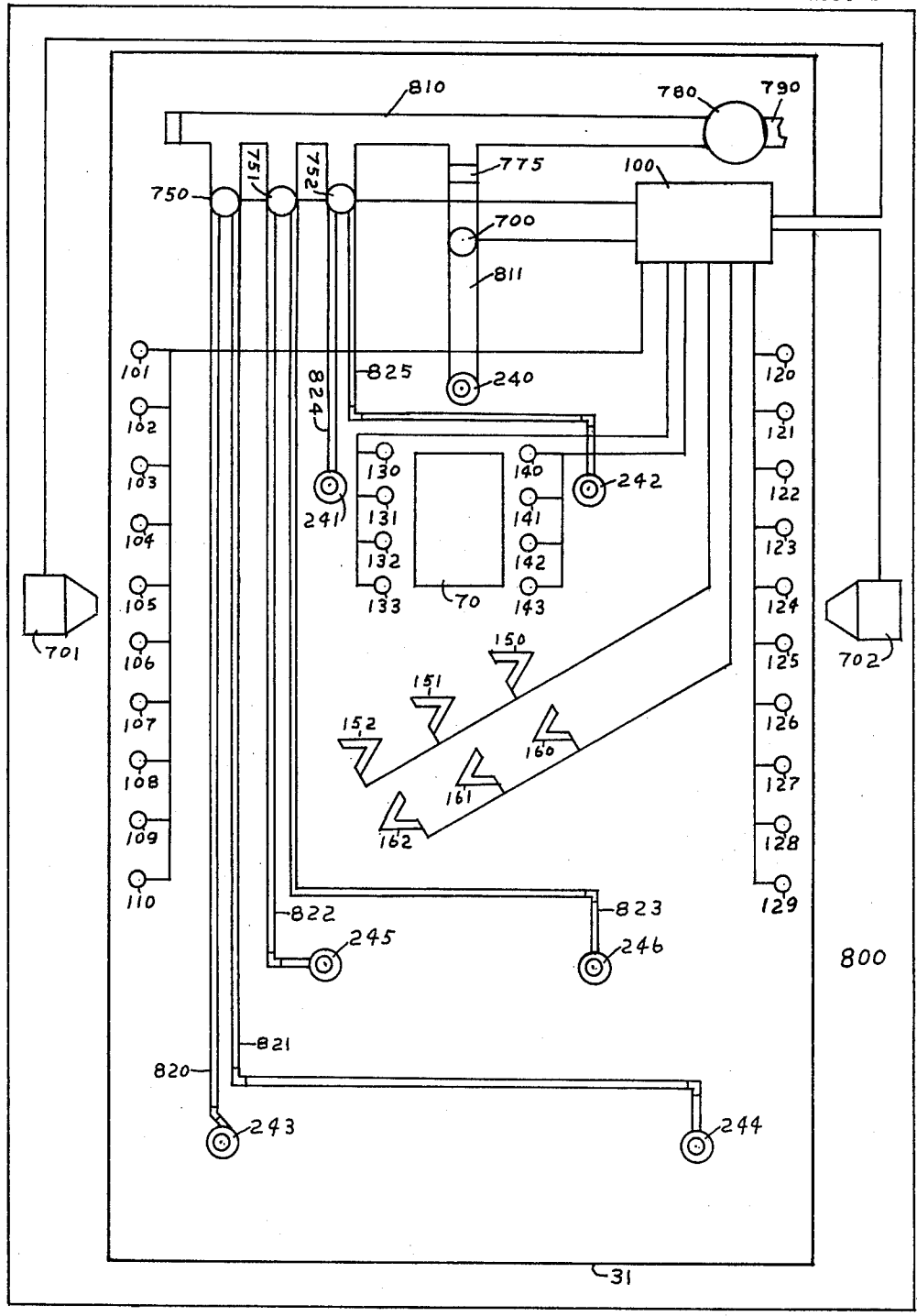
FIG. 6 is a unitary schematic drawing of a preferred form of this invention.

FIG. 6 shows a preferred form of the control means of this invention, in schematic form. Cabinet 31 is immersed in tank 800 and pump 780 drives the water from intake 790 along main conduits 811 and 810 for discharge through various valves. Meter 775 represents an instrument for measuring the speed and volume of the water which passes through valve 700 and nozzle 240, towards the advancing swimmer. Light source 702, on edge of tank 800, produces light beam 703 which operates photoelectric control 701 which in turn controls electric valve 700 which discharges a jet of water towards the advancing swimmer when said swimmer interrupts light beam 703, thus stabilizing the swimmer relative to the cabinet.

Timer 100 operates all the lamp circuits shown in FIG. 5, as well as the solenoid valves 750, 751, and 752 which permit the expulsion of jets of water from conduit 810, via conduits 820–825 and out through adjustable nozzles 41–46. (Cabinet 31 is shown in a distorted horizontal view of its actual vertical, arcuate and horizontal sections, for the purpose of simplicity.)

This swimming instruction apparatus, 30, is shown with timer 100 attached to cabinet 31, in which case it would be protected from moisture. The timer 100 may also be situated remotely and used to operate the lamps and valves of numerous swimming instruction apparatus, 30, for instructing large classes. When the class of student swimmers are all taking the same lessons at the same time, the timer may be of the cam type, which cams can be conveniently adjusted or "programmed" to produce new patterns of visual and tactile signals as the student swimmers progress. More sophisticated timers are readily available which would enable the individual student to choose his own "program" by push-button means. The water measuring device 775 in FIG. 6 is used to determine the amount of water needed to repel the advance of, or stabilize, the swimmer. When the weight of the swimmer and the time element are known, appropriate graphs and tables can be used to determine the "speed" of the swimmer and the "distance" he has swum.

When recess 70 in FIG. 2 contains a translucent screen, a watertight, magazine-loaded, automatic slide projector will be situated behind said screen. The student swimmer, wearing appropriate goggles will then be able to view the proper progressive movements of a swimmer during each cycle of a desired swimming stroke and attempt to duplicate these movements at the same time.

It is to be understood that the invention as here set forth, must not be limited in scope to the drawing and/or specification. Many adaptations of this invention are possible. For example, it will be obvious that the pump may or may not be located within the cabinet. And in the event that this swimming instruction apparatus is made portable (and non-sinkable), the pump, timer and all electric and electronic circuits could be battery-operated. Nor need the energy beam shown be that of light; it could be sonic or other forms. Thus it will be seen that while the forms of the invention shown and described herein is admirably adapted to fulfill the objects primarily stated, the invention is susceptible of embodiment in various other forms.

What is claimed is:

1. An aquatic device for giving swimming instruction comprising a cabinet adapted to receive the body of a swimming student and being dimensioned to provide unobstructed use of the arms and legs in executing swimming strokes, said cabinet having a plurality of fluid expelling means on its vertical, arcuate and horizontal sections adjacent positions for the head, arms, trunk and legs for releasing fluid under pressure in a timed relation to indicate to the student appropriate coordination of the parts of the body in executing swimming strokes.

2. An aquatic device as defined in claim 1 wherein the fluid expelling means includes a plurality of adjustable nozzles on the exterior of said cabinet, conduits leading to said nozzles, solenoid valves connected to said conduits and timing means for controlling said valves for alternately releasing fluid jets through said conduits and nozzles in predetermined directions and tempos to correspond to desired body movements.

3. An aquatic device as defined in claim 1, including a body-actuating valve and head-rest means attached thereto for releasing water under pressure towards the swimmer's body, proportionally with the forward thrust of said swimmer's head against said head-rest.

4. An aquatic device as defined in claim 1, including a mirror, positioned on the exterior of said cabinet to reflect leg movements.

5. An aquatic device as defined in claim 1 wherein the fluid-expelling means include a plurality of nozzles on the horizontal section of said cabinet for buoying said student.

6. An aquatic device as defined in claim 1, including a translucent screen positioned on the exterior of said cabinet for displaying visual patterns of movements from a projector within said cabinet.

7. An aquatic device for giving swimming instruction comprising a cabinet, adapted to be nearly submerged at the periphery of a swimming tank and to receive the body of a student at a suitable distance from said cabinet's vertical, arcuate and horizontal sections, said cabinet having a plurality of fluid-expelling means and conduits for releasing fluid under pressure in a timed relation to indicate to the student appropriate coordination of the limbs in executing swimming movements, said cabinet having an electric valve for releasing a jet of water via a conduit and nozzle towards the advancing swimming student and said cabinet having energy-producing means for projecting an energy beam across the path of said advancing swimmer to an energy-receiving means, the latter controlling said electric valve in response to the interruption of said energy beam by said swimmer.

8. An aquatic device as defined in claim 7, including metered instruments attached to appropriate conduits for measuring the performance of said swimmer.

9. An aquatic device for giving instruction in body movements comprising a cabinet adapted to be inserted in a tank of water and to receive a student at a suitable distance from said cabinet's vertical, arcuate and horizontal sections, said cabinet having a plurality of colored lamps on said sections of said cabinet positioned in series corresponding to directional movements desired, said cabinet containing timing means for progressively illuminating said series of lamps for simulating a desired tempo in body movements.

10. An aquatic device for simulating body movements for instructing a student, comprising a cabinet adapted to be inserted in a tank of water and to receive said student at an appropriate distance therefrom, said cabinet having a plurality of nozzles and lamps on the vertical, arcuate and horizontal sections, opposite said student, said cabinet containing control means for synchronizing the visual signals of the lamps with the expulsion of jets of water from said nozzles to effect desired patterns of movements.

11. An aquatic device as defined in claim 10, including a screen, positioned on the exterior of said cabinet, for receiving and transmitting visual patterns of movements.

12. An aquatic device as defined in claim 10, including a valve-controlled conduit for releasing a fluid jet towards said student and electronic means for activating said valve in response to the forward thrust of said student.

13. An aquatic device for teaching swimming classes, comprising an apparatus, adapted to be nearly submerged in a body of water and to receive the body of a student at a suitable distance from and opposite to said apparatus' vertical, arcuate and horizontal sections, said sections having a plurality of lamps and nozzles thereon, said apparatus having power means, a pump, conduits, electric valves and a programmed timer therein for the timed, sequential illumination of said lamps and the timed, sequential expulsion of jets of water through said nozzles, said apparatus provided with a feedback system comprising a nozzle, conduit, and body-operated valve for directing a stream of water towards said student proportionally to the forward thrust of said student.

References Cited in the file of this patent

UNITED STATES PATENTS

| | | |
|---|---|---|
| 845,441 | Vaughan | Feb. 26, 1907 |
| 1,630,797 | Marwick | May 31, 1927 |
| 1,731,554 | Wheeler | Oct. 15, 1929 |
| 1,796,291 | Lippincott | Mar. 17, 1931 |
| 1,921,230 | Hunter | Aug. 8, 1933 |
| 1,953,954 | Constable | Apr. 10, 1934 |
| 2,035,835 | Raber | Mar. 31, 1936 |
| 2,430,205 | Barry | Nov. 4, 1947 |
| 2,875,528 | Garate | Mar. 3, 1959 |

FOREIGN PATENTS

| | | |
|---|---|---|
| 882,621 | France | Mar. 8, 1943 |